(12) United States Patent
Kishima

(10) Patent No.: US 8,654,188 B2
(45) Date of Patent: Feb. 18, 2014

(54) INFORMATION PROCESSING APPARATUS, INFORMATION PROCESSING SYSTEM, INFORMATION PROCESSING METHOD, AND PROGRAM

(75) Inventor: Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 13/159,613

(22) Filed: Jun. 14, 2011

(65) Prior Publication Data

US 2011/0316998 A1    Dec. 29, 2011

(30) Foreign Application Priority Data

Jun. 29, 2010   (JP) ................. P2010-148280

(51) Int. Cl.
  *H04N 7/18*   (2006.01)
(52) U.S. Cl.
  USPC ........................................ 348/79
(58) Field of Classification Search
  USPC ........................................ 348/79
  See application file for complete search history.

(56) References Cited

U.S. PATENT DOCUMENTS

| 6,031,930 | A | 2/2000 | Basuc et al. |
| 6,239,834 | B1 * | 5/2001 | Miyaji et al. .................. 348/193 |
| 7,538,815 | B1 * | 5/2009 | Belikov et al. ................ 348/353 |
| 8,253,788 | B2 * | 8/2012 | Maddison et al. .............. 348/79 |
| 2008/0304147 | A1 * | 12/2008 | Kawanabe et al. ............ 359/388 |
| 2009/0309963 | A1 * | 12/2009 | Ogihara et al. ................ 348/79 |

FOREIGN PATENT DOCUMENTS

JP   2009-37250   2/2009

* cited by examiner

*Primary Examiner* — Dave Czekaj
*Assistant Examiner* — Leron Beck
(74) *Attorney, Agent, or Firm* — K&L Gates LLP

(57) ABSTRACT

An image processing apparatus includes an interface connected to a microscope having a stage having a placement surface on which a sample including a target is placed, an objective lens that zooms in an image of the sample, and an image pickup element that forms the image of the sample, a controller, and a memory. The controller causes a focus of the objective lens to shift in a vertical direction to the placement surface, and causes the image pickup element to be exposed, thereby obtaining a first image. The controller performs a uniform shift of the focus in the vertical direction and a uniform linear shift thereof in a parallel direction to the placement surface, and causes the image pickup element to be exposed, thereby obtaining a second image. The controller calculates a position of the target in the vertical direction based on the first and second images.

6 Claims, 7 Drawing Sheets

INFORMATION PROCESSING APPARATUS, INFORMATION PROCESSING SYSTEM, INFORMATION PROCESSING METHOD, AND PROGRAM

CROSS REFERENCES TO RELATED APPLICATIONS

The present application claims priority to Japanese Priority Patent Application JP 2010-148280 filed in the Japan Patent Office on Jun. 29, 2010, the entire content of which is hereby incorporated by reference.

BACKGROUND

The present application relates to an information processing apparatus that processes image information obtained by a microscope in a field of medicine, pathology, biology, material science, or the like, an information processing system having the image processing apparatus, and an information processing method and a program in the image processing apparatus.

In the field of medicine or pathology, there has been proposed a system that digitizes an image of a sample such as a cell, a tissue, an organ, or the like of a living body, that is obtained by an optical microscope, to examine the tissue or the like or diagnose a patient by a doctor or a pathologist on the basis of the digital image obtained. Generally, such a system is called a virtual microscope.

For example, Japanese Patent Application Laid-open No. 2009-37250 (hereinafter, referred to as Patent Document 1) discloses a method in which an image optically obtained from a slide sample which is placed on a stage of a microscope is digitized by a video camera equipped with a CCD (charge coupled device), a digital signal thus obtained is input to a PC (personal computer), and the image is visualized on a monitor. A pathologist performs examination or the like while watching the image displayed on the monitor.

SUMMARY

Incidentally, in the virtual microscope system, image data is obtained by shifting a focus at predetermined intervals in a depth direction (focus direction) of a sample, thereby detecting a position of a target (fluorescent marker) in the depth direction which exists in one cell nucleus and has been fluorescently stained, for example. However, in this method, it is necessary to store a plurality of pieces of image data for each of the predetermined intervals (in the case where the sample exists on almost one surface of the slide glass, a data amount per piece of image data is approximately 4 GB), and a data capacity is increased, with the result that a memory having a large capacity becomes necessary.

In view of the above-mentioned circumstances, it is desirable to provide an image processing apparatus, an image processing system, an image processing method, and a program which are capable of easily detecting the depth position of a target in a sample without using a memory having a large capacity.

According to an embodiment, there is provided an image processing apparatus including an interface, a controller, and a memory. The interface is configured to be connected to a microscope. The microscope has a stage having a placement surface on which a sample including a target that is subjected to marking is placed, an objective lens that zooms in an image of the sample, and an image pickup element that forms the image of the sample zoomed in by the objective lens. The controller is configured to cause, through the interface, a focus of the objective lens to shift from a predetermined reference position in a vertical direction to the placement surface, and cause the image pickup element to be exposed during the shift of the focus in the vertical direction, thereby obtaining a first image including a first bright point that indicates the target. Further, the controller is configured to perform, through the interface, a uniform shift of the focus from the reference position in the vertical direction at a first velocity and a uniform linear shift thereof in a parallel direction to the placement surface at a second velocity, and cause the image pickup element to be exposed during the shift of the focus in the vertical direction and the parallel direction, thereby obtaining a second image including a second bright point that indicates the target. Furthermore, the controller is configured to calculate a position of the target in the sample in the vertical direction based on the first image and second image obtained. The memory is configured to store the first image and second image obtained.

In this embodiment, the image pickup element is exposed while shifting the focus in the vertical direction and the parallel direction, so in the second image, for each focus, the state in which the image of the target is blurred is gradually changed to the state in which the image thereof is clear. Further, in the second image, at the position where the focus is most matched with the target, the brightness of the image of the target becomes largest and is indicated as the second bright point.

With this structure, only by obtaining the first image and the second image through the two exposure, the image processing apparatus can easily detect the position of the target in the sample in the vertical direction with high accuracy while saving the capacity of the memory.

The controller may calculate a distance between the first bright point and the second bright point in the parallel direction based on the first image and the second image and calculate the position of the target based on the distance, the first velocity, and the second velocity.

As a result, only by calculating the distance between the first brightness and the second brightness in the parallel direction on the basis of the first image and the second image, the image processing apparatus can easily detects the position of the target in the vertical direction with high accuracy.

The first velocity may be higher than the second velocity.

As a result, in the second image, the range in which the images of the target for different focuses are overlapped become small, so the position of the second bright point is more easily detected.

The controller may generate a composite image obtained by combining the first image and the second image and calculate the distance by using the composite image.

As a result, by measuring the distance between the first bright point and the second bright point on the composite image, the image processing apparatus can easily detect the position of the target in the vertical direction.

According to another embodiment, there is provided an image processing system including a microscope and an image processing apparatus. The microscope has a stage having a placement surface on which a sample including a target that is subjected to marking is placed, an objective lens configured to zoom in an image of the sample, and an image pickup element configured to form the image of the sample zoomed in by the objective lens. The image processing apparatus has an interface, a controller, and a memory. The interface is configured to connect to the microscope. The controller is configured to cause, through the interface, a focus of the objective lens to shift from a predetermined reference position in a vertical direction to the placement surface, and causes the image pickup element to be exposed during the shift of the focus in the vertical direction, thereby obtaining a first image including a first bright point that indicates the target. Further, the controller is configured to perform, through the interface, a uniform shift of the focus from the reference position in the vertical direction at a first velocity and a uniform linear shift thereof in a parallel direction to the placement surface at a second velocity, and causes the image pickup element to be exposed during the shift of the focus in the vertical direction and the parallel direction, thereby obtaining a second image including a second bright point that indicates the target. Furthermore, the controller is configured to calculate a position of the target in the sample in the vertical direction based on the first image and second image obtained. The memory is configured to store the first image and second image obtained.

According to another embodiment, there is provided an image processing method including making a connection to a microscope having a stage having a placement surface on which a sample including a target that is subjected to marking is placed, an objective lens that zooms in an image of the sample, and an image pickup element that forms the image of the sample zoomed in by the objective lens. A focus of the objective lens is caused to shift from a predetermined reference position in a vertical direction to the placement surface, and the image pickup element is caused to be exposed during the shift of the focus in the vertical direction, thereby obtaining a first image including a first bright point that indicates the target. Further, a uniform shift of the focus is performed from the reference position in the vertical direction at a first velocity, a uniform linear shift thereof is performed in a parallel direction to the placement surface at a second velocity, and the image pickup element is caused to be exposed during the shift of the focus in the vertical direction and the parallel direction, thereby obtaining a second image including a second bright point that indicates the target. In a memory, the first image and second image obtained are stored. A position of the target in the sample in the vertical direction is calculated based on the first image and second image stored.

According to another embodiment, there is provided a program that causes an image processing apparatus to execute making a connection to a microscope having a stage having a placement surface on which a sample including a target that is subjected to marking is placed, an objective lens that zooms in an image of the sample, and an image pickup element that forms the image of the sample zoomed in by the objective lens, causing a focus of the objective lens to shift from a predetermined reference position in a vertical direction to the placement surface, and causing the image pickup element to be exposed during the shift of the focus in the vertical direction, thereby obtaining a first image including a first bright point that indicates the target, performing a uniform shift of the focus from the reference position in the vertical direction at a first velocity and a uniform linear shift thereof in a parallel direction to the placement surface at a second velocity, and causing the image pickup element to be exposed during the shift of the focus in the vertical direction and the parallel direction, thereby obtaining a second image including a second bright point that indicates the target, storing, in a memory, the first image and second image obtained, and calculating a position of the target in the sample in the vertical direction based on the first image and second image stored.

As described above, according to the embodiments of the present application, it is possible to easily detect the depth position of the target in the sample without using the memory having the large capacity.

Additional features and advantages are described herein, and will be apparent from the following Detailed Description and the figures.

DETAILED DESCRIPTION

Embodiments of the present application will be described below in detail with reference to the drawings.

Structure of Image Processing System

Figure 1:
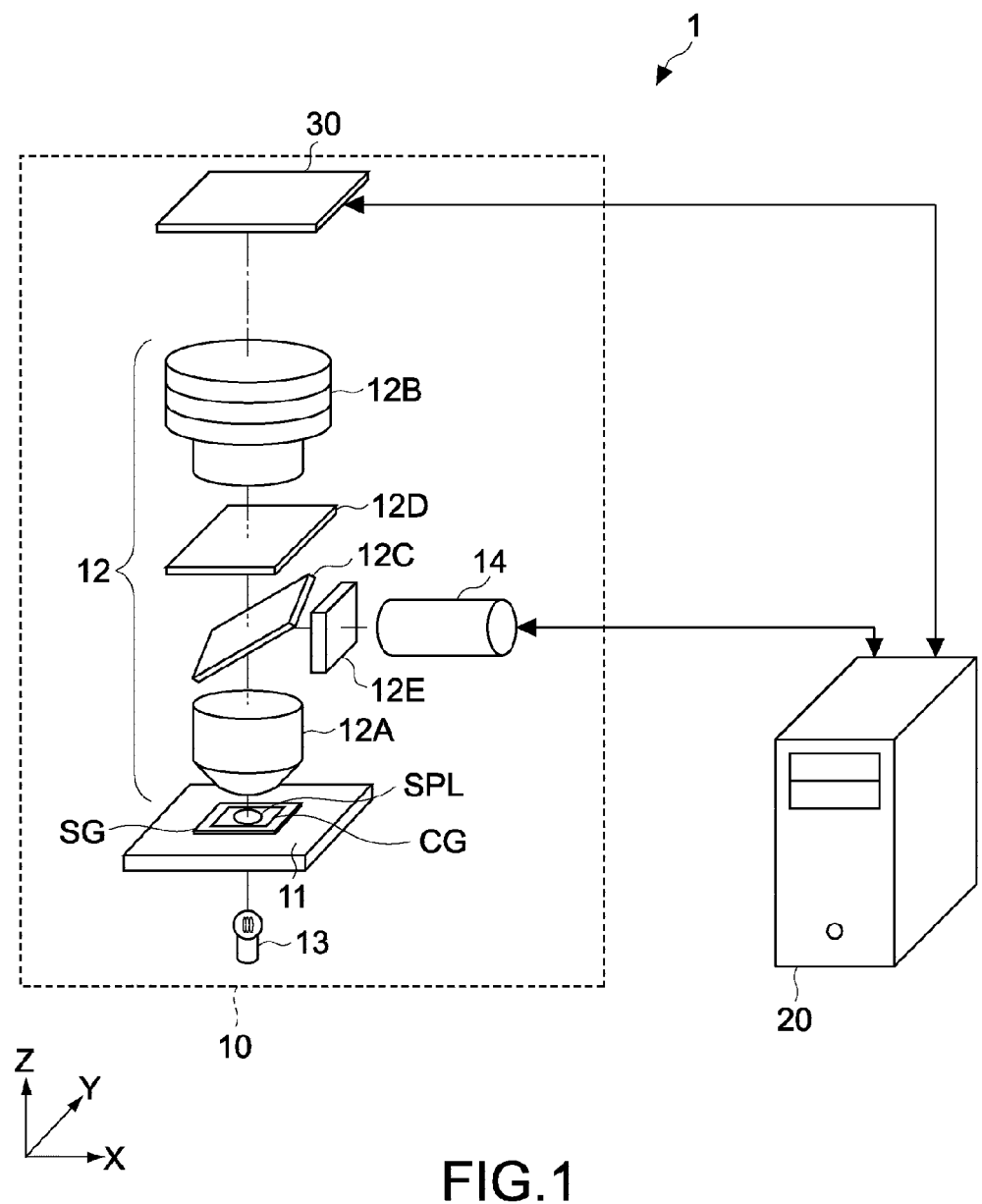
FIG. 1 is a diagram showing an image processing system according to an embodiment.

FIG. 1 is a diagram showing an image processing system according to an embodiment. As shown in the figure, an image processing system 1 in this embodiment has a microscope (fluorescent microscope) 10 and an image processing apparatus 20 connected to the microscope 10.

The microscope 10 has a stage 11, an optical system 12, a bright-field image taking illumination light 13, a light source 14, and an image pickup element 30.

The stage 11 has a placement surface on which a sample SPL such as a biological polymer including a slice of a tissue, a cell, a chromosome, and the like can be placed, and can be moved in a parallel direction and a vertical direction (XYZ-axis directions) to the placement surface.

Figure 2:
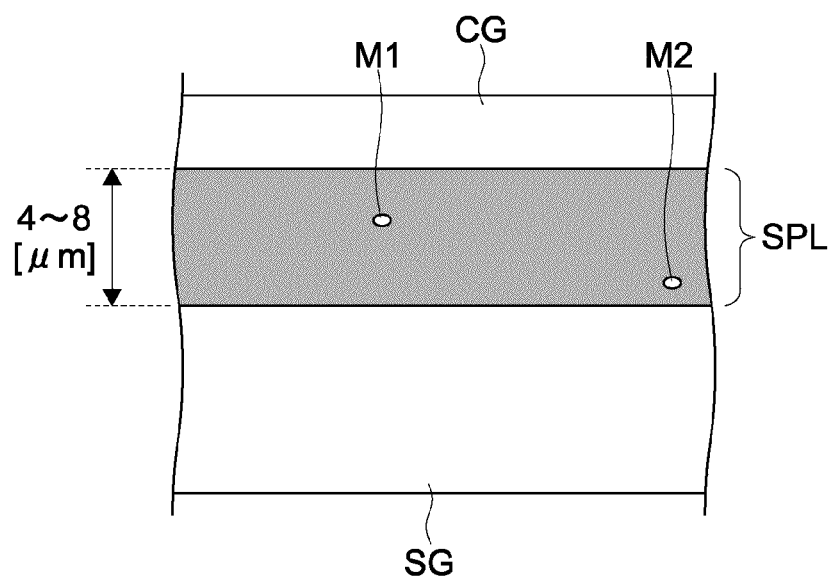
FIG. 2 is a diagram showing a sample SPL, an image of which is taken in the embodiment, from a side surface of a stage.

FIG. 2 is a diagram showing the sample SPL placed on the stage 11 from a side surface direction of the stage 11.

As shown in the figure, the sample SPL has a thickness (depth) of approximately 4 to 8 μm in the Z direction, is fixed in position by a predetermined fixation method with the sample SPL being sandwiched between a slide glass SG and a cover glass CG, and is stained when necessary. Examples of the stain method include general stain methods such as an HE (hematoxylin-eosin) stain, Giemsa stain, and Papanicolaou stain, and a fluorescence stain such as FISH (fluorescence in situ hybridization) and an enzyme antibody method. The fluorescence stain is performed to carry out marking of a specific target in the sample, for example. The target that has been fluorescently stained is indicated as a fluorescent marker M (M1 and M2) in the figure, and the fluorescent marker M appears as a bright point in an image obtained by the microscope.

Returning to FIG. 1, the optical system 12 is provided above the stage 11 and has an objective lens 12A, an image forming lens 12B, a dichroic mirror 12C, an emission filter 12D, and an excitation filter 12E. The light source 14 is formed of an LED (light emitting diode) or the like.

The objective lens 12A and the image forming lens 12B zoom in an image of the sample SPL obtained by the bright-field image taking illumination light 13 at a predetermined magnification, and the image zoomed in is formed on an image pickup surface of the image pickup element 30.

Out of light emitted from the light source 14, the excitation filter 12E causes only light at an excitation wavelength which excites a fluorochrome to pass therethrough, thereby generating excitation light. The dichroic mirror 12C reflects the excitation light that has passed through the excitation filter and is incident thereon and guides the light to the objective lens 12A. The objective lens 12A collects the excitation light to the sample SPL.

In the case where the sample SPL which is fixed to the slide glass SG is fluorescently stained, the fluorochrome emits light by the excitation light. The light (color forming light) obtained by the light emission passes through the dichroic mirror 12C through the objective lens 12A and reaches the image forming lens 12B through the emission filter 12D.

The emission filter 12D absorbs light (external light) excluding the color forming light zoomed in by the objective lens 12A. An image of the color forming light obtained by losing the external light is zoomed in by the image forming lens 12B and formed on the image pickup element 30 as described above.

The bright-field image taking illumination light 13 is provided below the stage 11 and illuminates the sample SPL placed on the placement surface through an opening (not shown) formed in the stage 11 with illumination light.

As the image pickup element 30, for example, a CCD (charge coupled device) or a CMOS (complementary metal oxide semiconductor) is used. The image pickup element 30 may be provided integrally with the microscope 10 or may be provided in an image pickup apparatus (digital camera or the like) which is separately provided and can be connected to the microscope 10.

The image processing apparatus 20 is configured by a PC (personal computer), for example, and stores the image of the sample SPL which is generated by the image pickup element 30 as digital image data (virtual slide) with a predetermined format such as JPEG (joint photographic experts group), for example.

(Structure of Image Processing Apparatus)

Figure 3:
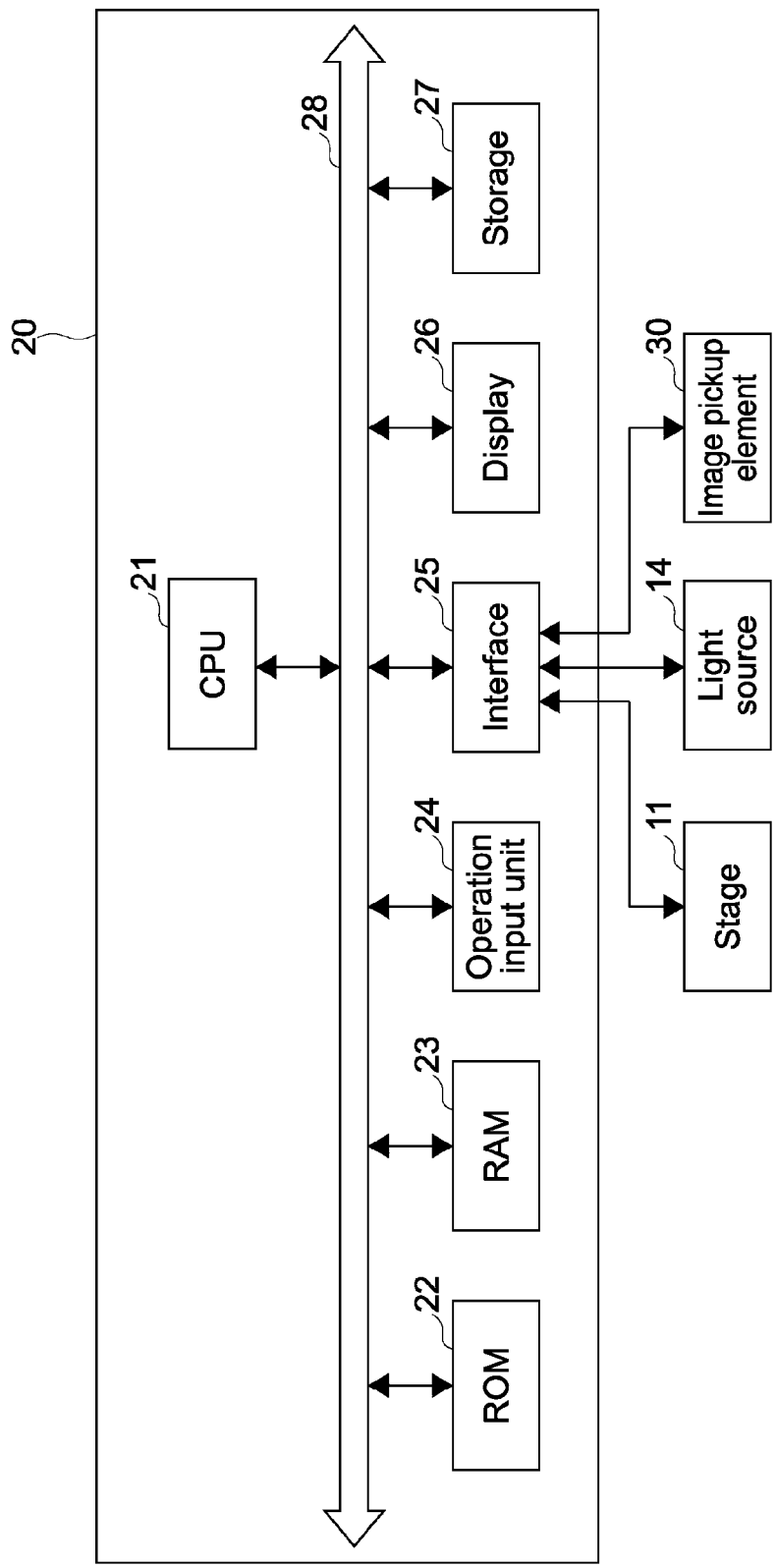
FIG. 3 is a block diagram showing the structure of an image processing apparatus according to the embodiment.

FIG. 3 is a block diagram showing the structure of the image processing apparatus 20.

As shown in the figure, the image processing apparatus 20 has a CPU (central processing unit) 21, a ROM (read only memory) 22, a RAM (random access memory) 23, an operation input unit 24, an interface 25, a display 26, and a storage 27. Those blocks are connected with each other via a bus 28.

The ROM 22 fixedly stores data or a plurality of programs such as firmware for performing various processes. The RAM 23 is used as a work area for the CPU 21 and temporarily holds various applications in execution and various data which are being processed.

The storage 27 is a non-volatile memory such as an HDD (hard disk drive), a flash memory, and another solid-state memory. The storage 27 stores an OS, various applications, or various data therein. In particular, in this embodiment, image data taken from the microscope 10 and an image processing application for processing the image data and calculating the depth (height) position of the bright point of the target in the sample SPL are also stored in the storage 27.

The interface 25 connects the image processing apparatus 20 with the stage 11, the light source 14, and the image pickup element 30 of the microscope 10 and transmits or receives a signal with the microscope 10 in accordance with a predetermined communication standard.

Out of the plurality of programs stored in the ROM 22 or the storage 27, the CPU 21 develops a program corresponding to a command given from the operation input unit 24 into the RAM 23 and appropriately controls the display 26 and the storage 27 in accordance with the program thus developed. In this embodiment, in particular, the CPU 21 calculates the depth position of the target in the sample SPL by the image processing application. At this time, the CPU 21 appropriately controls the stage 11, the light source 14, and the image pickup element 30 through the interface 25.

The operation input unit 24 is, for example, a pointing device such as a mouse, a keyboard, a touch panel, or another operation apparatus.

The display 26 is, for example, a liquid crystal display, an EL (electro-luminescence) display, a plasma display, a CRT (cathode ray tube) display, or the like. The display 26 may be internally provided in the image processing apparatus 20 or may be externally provided to the image processing apparatus 20.

Operation of Image Processing System

Next, a description will be given on the operation of the image processing system 1 structured as described above. In the following description, the CPU 21 of the image processing apparatus 20 is used as the main of the operation, but the operation is also performed in cooperation with different hardware of the image processing apparatus 20 and software such as the image processing application.

Figure 4:
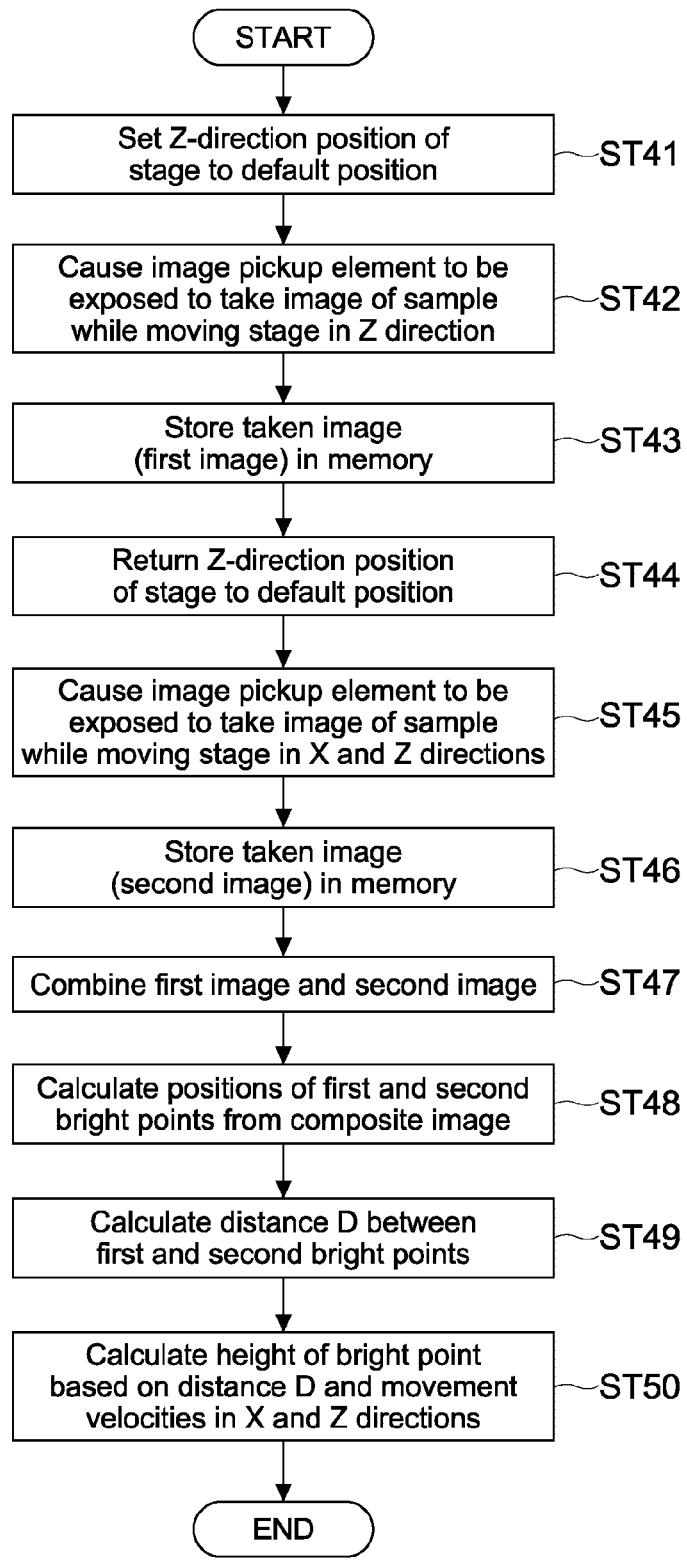
FIG. 4 is a flowchart showing a calculation process of a depth position of a target in the sample which is performed by the image processing apparatus in the embodiment.
Figure 5:
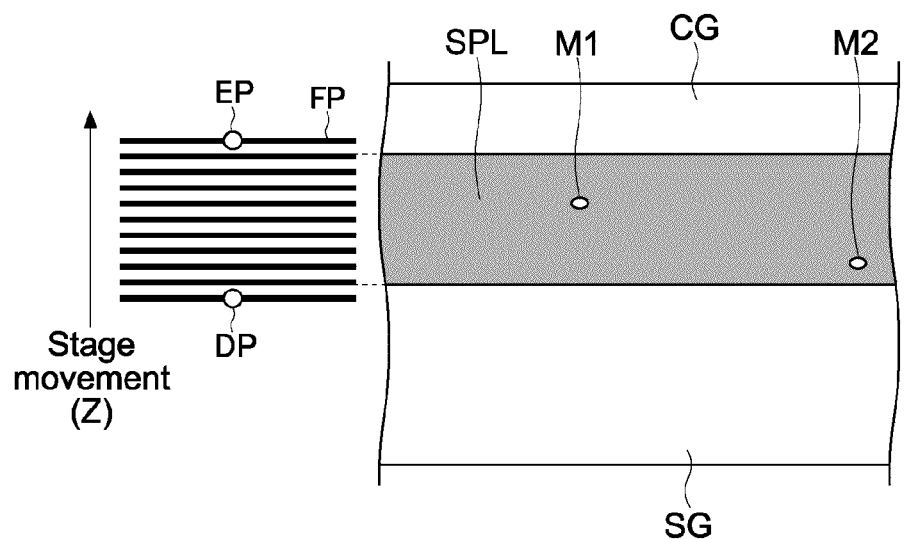
FIG. 5 is a diagram showing the state of a shift of a focus in a Z direction in the embodiment.

FIG. 4 is a flowchart showing the calculation process of the depth position of the target in the sample SPL which is performed by the image processing apparatus 20 in this embodiment. FIG. 5 is a diagram showing the state of the shift of the focus in the Z direction corresponding to Steps 41 and 42.

As shown in FIG. 4, first, the CPU 21 sets a default position of the stage 11 in the vertical (Z) direction in the state where the sample SPL is placed on the stage 11, and the image processing apparatus 20 is connected with the microscope 10 (Step 41). As shown in FIG. 5, the default position DP is set so that the position of a focal plane FP of the objective lens 12A is outside (upper area or lower area) of a range where the sample SPL exists, that is, so that a shift range (scanning range) of the focus covers the entire surface of the sample SPL in the following exposure (scanning) step.

Next, as indicated by the arrow shown in FIG. 5, the CPU 21 causes the image pickup element 30 to be exposed while performing a uniform shift of the stage 11 (that is, focus) at a predetermined velocity from the default position DP in the vertical direction (Z direction), thereby taking an image of the sample SPL (Step 42). Here, the CPU 21 sets, as an end point EP of the shift, such a position that the shift range of the focus covers the entire surface of the sample SPL. In other words, the default position DP and the end point EP are set so that the sample SPL is completely included in the range from the default position DP to the end point EP (so that the distance of the shift of the focus is longer than the thickness of the sample SPL).

Figure 6:
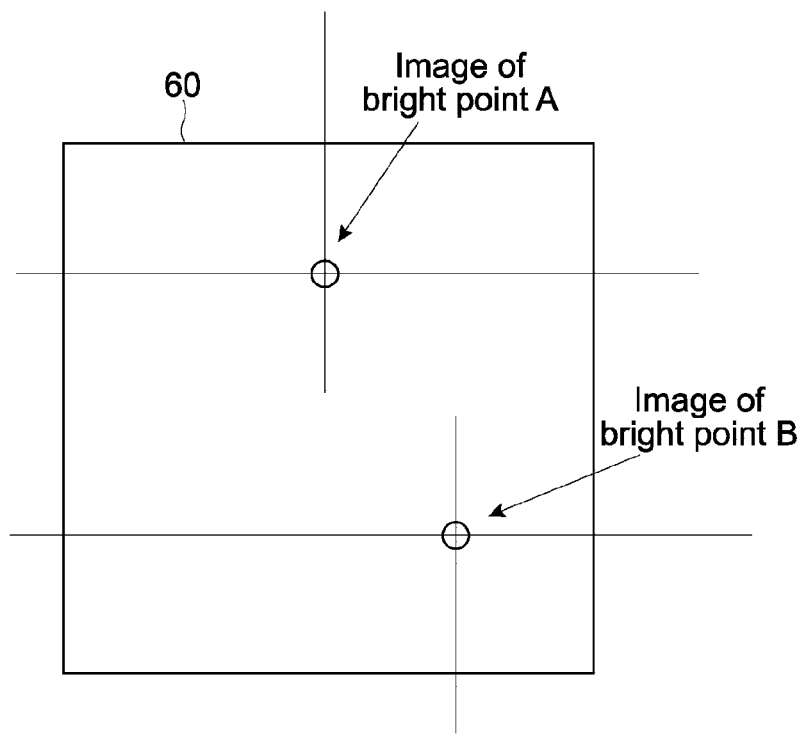
FIG. 6 is a diagram showing an image (first image) of the sample which is obtained by performing an exposure process with the focus being shifted in the Z direction in the embodiment.

FIG. 6 is a diagram showing an image (first image) of the sample SPL which is obtained by performing the exposure process with the focus being shifted in the Z direction as described above. As shown in the figure, in a first image 60, the fluorescent marker M1 appears as an image of a bright point A, and the fluorescent marker M2 appears as an image of a bright point B.

Here, the first image 60 is the image which has been exposed and taken with the focus of the sample SPL being shifted in the Z direction, and therefore is an image in which an image on the focal plane FP where the focus coincides with the fluorescent markers M1 and M2 and an image different therefrom are overlapped with each other. Thus, the images of the bright points A and B have blurred ambient images, but those positions appear to such an extent as to be capable of being clearly recognized.

The CPU 21 obtains the first image 60 from the image pickup element 30 through the interface 25 and temporarily stores the first image 60 in the RAM 23 (Step 43).

Subsequently, the CPU 21 returns the position of the stage 11 in the Z direction to the default position DP (Step 44).

Figure 7:
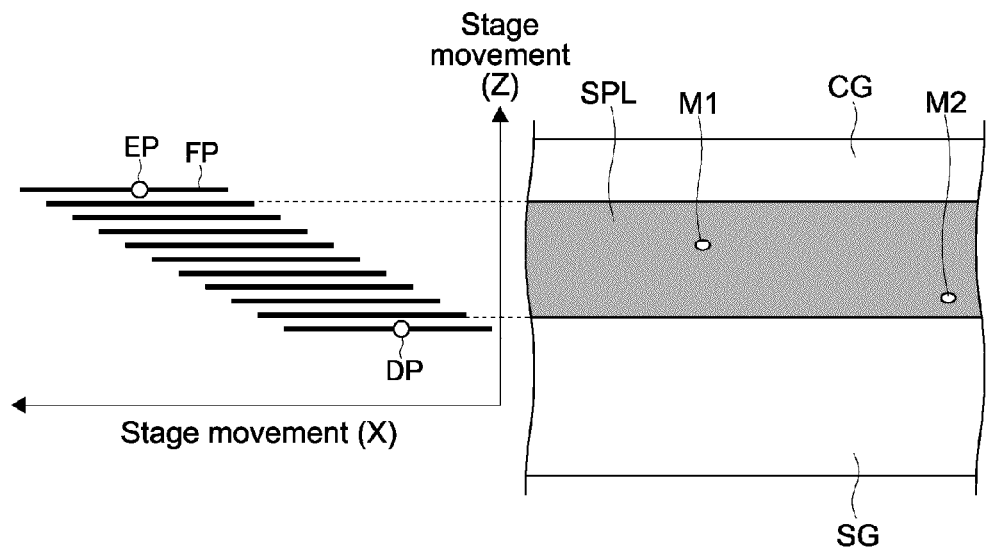
FIG. 7 is a diagram showing the state of the shift of the focus in the Z direction and in an X direction in the embodiment.

FIG. 7 is a diagram showing the state of the shift of the focus in the Z direction and the X direction which corresponds to Steps 45 and 46 shown in FIG. 4.

Subsequently, as shown in FIG. 7, the CPU 21 causes the image pickup element 30 to be exposed while performing a uniform shift of the stage 11 (focus) from the default position DP to the end point EP at a first velocity (Vz) in the Z direction and at a second velocity (Vx) in the X direction, thereby taking an image of the sample SPL (Step 45).

Figure 8:
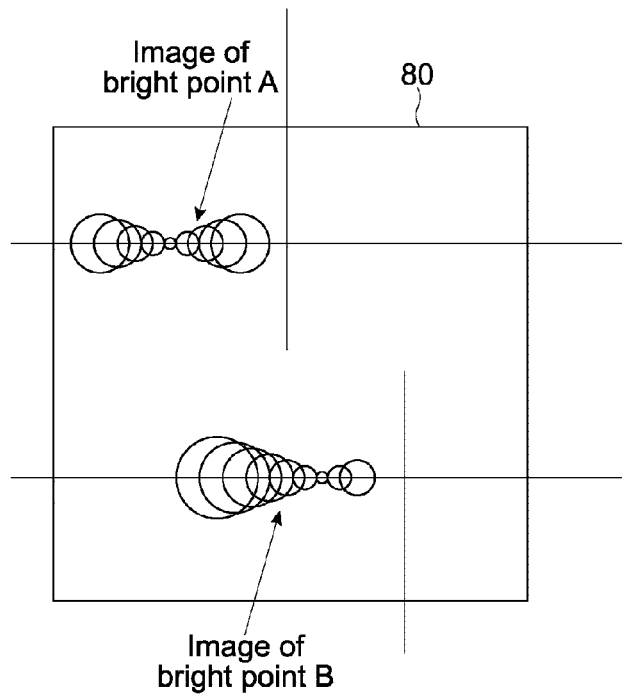
FIG. 8 is a diagram showing an image (second image) of the sample obtained by performing the exposure process with the focus being shifted in the Z direction and the X direction in the embodiment.

FIG. 8 is a diagram showing an image (second image) of the sample SPL obtained by performing the exposure process with the focus being shifted in the Z direction and the X direction as described above. As shown in the figure, in a second image 80, trajectories of images for each change of the position of the focus in the sample SPL are appeared in one image. That is, along with the shift of the focus in the X direction, the states of the images of the bright point A and the bright point B indicating the fluorescent markers M1 and M2, respectively, are changed from a blurred and large state, to a clear and small state of being brought into a focus, and further changed to the blurred and large state again.

The CPU 21 obtains the second image 80 from the image pickup element 30 through the interface unit 25 and temporarily stores the second image 80 in the RAM 23 (Step 46).

Subsequently, the CPU 21 combines the first image 60 and the second image 80 with each other, thereby generating a composite image (Step 47).

Figure 9:
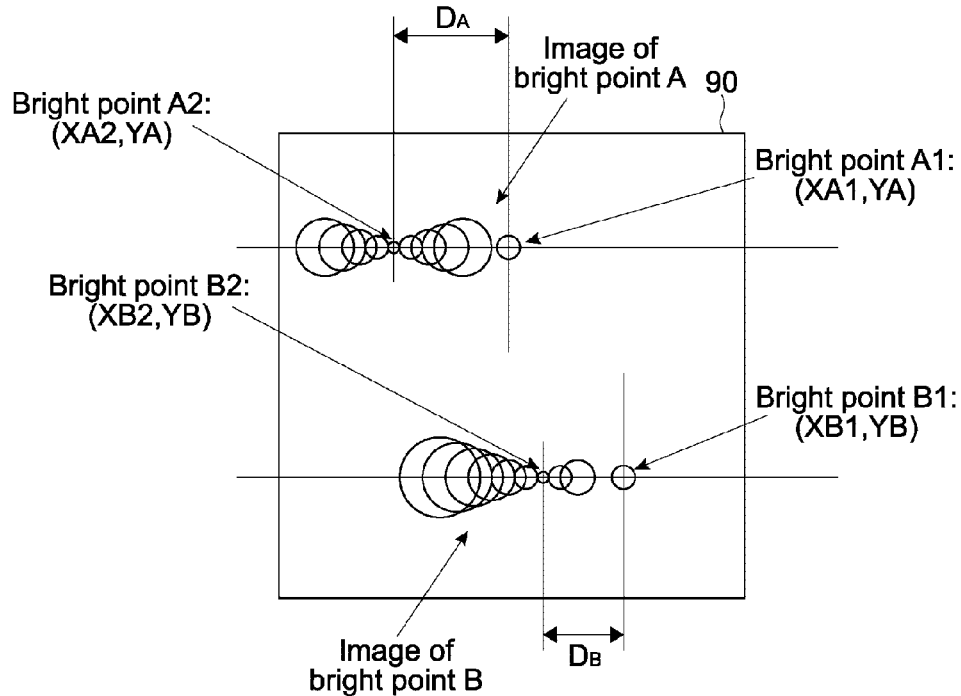
FIG. 9 is a diagram showing a composite image obtained by combining the first image of FIG. 6 and the second image of FIG. 8.

FIG. 9 is a diagram showing the composite image. As shown in the figure, in a composite image 90, images of the bright point A and the bright point B (bright point A1 and bright point B1) which appear in the first image 60 obtained in Step 42 and images of the bright point A and the bright point B (bright point A2 and bright point B2) which appear in the second image 80 obtained in Step 45 appear on the same straight line in one image, respectively.

Subsequently, the CPU 21 detects, from the composite image 90, position coordinates (A1: (XA1, YA), B1: (XB1, YB)) of the bright points A1 and B1 (first bright points) in the first image 60 and position coordinates (A2: (XA2, YA), B2: (XB2, YB)) of the bright points A2 and B2 (second bright points) in the second image 80 (Step 48). Here, the detection of the bright points are carried out by, for example, extracting a group of a plurality of pixels having a luminance value (fluorescence intensity) equal to or larger than a predetermined threshold value and detecting the position of a pixel having a highest luminance by the CPU 21. In the case where the fluorescent stain is performed in different colors depending on targets, the CPU 21 detects the luminance for each of the different colors.

Then, the CPU 21 calculates a distance D between the coordinates of the first bright point and the coordinates of the second bright point detected (Step 49). That is, in FIG. 9, the CPU 21 calculates a distance $D_A$ (XA1-XA2) between the first bright point A1 (XA1, YA) and the second bright point A2 (XA2, YA) and a distance $D_B$ (XB1-XB2) between the first bright point B1 (XB1, YB) and the second bright point B2 (XB2, YB).

Then, on the basis of the distance D, the first velocity Vz, which is the shift velocity of the focus in the Z direction, and the second velocity Vx, which is the shift velocity of the focus in the X direction, the CPU 21 calculates depths (heights) h of the fluorescent markers M in the sample SPL (Step 50).

Figure 10:
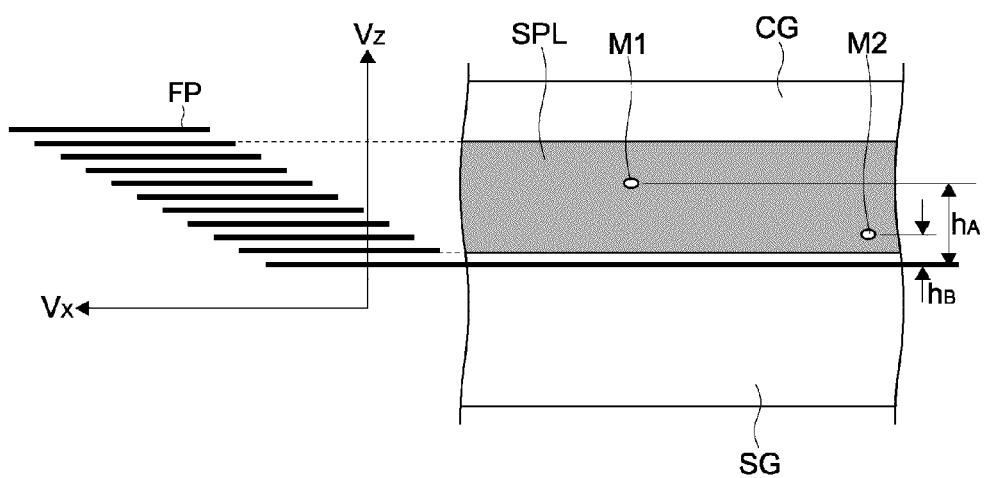
FIG. 10 is a diagram showing a calculation process of the depth position of the target by using the composite image of FIG. 9.

FIG. 10 is a diagram showing the calculation process of the heights of the fluorescent markers M by using the composite image 90 of FIG. 9. Here, a time $t_A$ from when the stage 11 is started to move until when the bright point A comes into focus is calculated from $t_A = h_A/Vz$ (where $h_A$ represents the height of the bright point A in the sample SPL).

Further, the distance $D_A$ and the distance $D_B$ are expressed by the following expressions.

$$D_A = t_A * Vx = Vx * h_A/Vz = h_A * Vx/Vz$$

$$D_B = h_B * Vx/Vz$$

When those expressions are transformed, the heights $h_A$ and $h_B$ of the bright points A and B can be calculated from the following expressions.

$$h_A = D_A * Vz/Vx$$

$$h_B = D_B * Vz/Vx$$

The CPU 21 calculates the heights $h_A$ and $h_B$ of the bright points A and B on the basis of the expressions concerned and outputs the calculation result to, for example, the display 26 for each bright point. When the heights of the bright points are calculated, it becomes possible to judge whether or not the fluorescent marker M1 indicated by the bright point A and the fluorescent marker M2 indicated by the bright point B exist in the same tissue (cell), for example. Further, it becomes also possible to detect a three-dimensional distance of each of the fluorescent marker M1 and the fluorescent marker M2. An operator of the image processing system can use the calculation result for various materials for pathological diagnoses, studies for new medicines, or the like.

Here, the second velocity Vx is set to be higher than the first velocity Vz. This is because in the composite image 90, when the coordinates (A2 and B2) of the focused position are specified from the image of the bright point A and the image of the bright point B which are derived from the second image 80, if the overlapped range of blurred images is large, it becomes difficult to separate the images, which makes it difficult to specify the coordinates (A2 and B2).

In addition, as shown in FIG. 10, the heights $h_A$ and $h_B$ of the bright points A and B are calculated as distances from the default position DP of the focus to the bright points. Therefore, to calculate an accurate height with only the inside of the sample SPL being as a reference, the length corresponding to a distance from the default position DP to a boundary line between the slide glass SG and the sample SPL is subtracted from each of the heights $h_A$ and $h_B$ calculated.

Conclusion

As described above, according to this embodiment, the image processing apparatus 20 obtains the image (first image)

of the fluorescent marker M (target) which is taken by performing the exposure while shifting the focus only in the Z direction and the image (second image) of the fluorescent marker M which is taken by performing the exposure while shifting the focus in the Z direction and the X direction, and calculates the distance between the first bright point in the first image and the second bright point in the second image. Thus, by using only two images, the image processing apparatus 20 can easily detect the position (height) of the target (fluorescent marker M) in the sample SPL in the vertical direction with high accuracy while saving the capacity of the RAM 23.

Modified Example

The present application is not limited to the above embodiment and can be variously changed without departing from the gist of the present application.

In the above embodiment, to calculate the distance D from the first bright point to the second bright point, the composite image 90 obtained by combining the first image 60 and the second image 80 is generated. However, the distance D can be calculated without using the composite image 90. Specifically, the CPU 21 may detect coordinates of the bright points in the first image 60 and the second image 80 in advance and apply the coordinates of the first bright point detected in the first image 60 to the second image 80 or apply the coordinates of the second bright point detected in the second image 80 to the first image 60, thereby calculating the distance D.

In the above embodiment, the second velocity Vx is set to be larger than the first velocity Vz, but this is not essential. For example, the CPU 21 weakens the intensity of the light source 14, thereby making it possible to separate the images of the bright points along with the shift in the X direction, with the result that the same effect can be obtained.

In the above embodiment, in obtaining the second image 80, the focus is shifted in the Z direction and X direction. However, the focus may of course be shifted not in the X direction but in the Y direction, or may be shifted in any direction other than directions parallel to the X axis or the Y axis as long as a linear shift is carried out in the XY plane.

In the above embodiment, in obtaining the first image 60 and the second image 80, the image processing apparatus 20 causes the focus to move by moving the stage 11 in the Z direction. However, the image processing apparatus 20 may be provided with a mechanism for moving the objective lens 12A in the Z direction, for example, and may cause the focus to move by moving not the stage 11 but the objective lens 12A by using the mechanism.

In the above embodiment, in obtaining the second image 80, the image processing apparatus 20 causes the focus to move by moving the stage 11 in the X (Y) direction. However, the image processing apparatus 20 may be provided with a mechanism for moving the image pickup element 30 in the X (Y) direction and may cause the focus to move by moving not the stage 11 but the image pickup element 30 by using the mechanism.

In the above embodiment, the example in which the present application is applied to the fluorescent microscope is used. However, the present application may be applied to a microscope other than the fluorescent microscope. In this case, the target does not have to be fluorescently stained, and only has to be subjected to marking by any marking method so as to be observed as a bright point.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An image processing apparatus, comprising:
an interface configured to be connected to a microscope having a stage having a placement surface on which a sample including a target that is subjected to marking is placed, an objective lens that zooms in an image of the sample, and an image pickup element that forms the image of the sample zoomed in by the objective lens;
a controller configured
to cause, through the interface, a focus of the objective lens to shift from a predetermined reference position in a vertical direction to the placement surface, and cause the image pickup element to be exposed during the shift of the focus in the vertical direction, thereby obtaining a first image including a first bright point that indicates the target,
to perform, through the interface, a uniform shift of the focus from the reference position in the vertical direction at a first velocity and a uniform linear shift thereof in a parallel direction to the placement surface at a second velocity, and cause the image pickup element to be exposed during the shift of the focus in the vertical direction and the parallel direction, thereby obtaining a second image including a second bright point that indicates the target, and
to calculate a position of the target in the sample in the vertical direction based on the first image and second image obtained; and
a memory configured to store the first image and second image obtained,
wherein the controller calculates a distance between the first bright point and the second bright point in the parallel direction based on coordinates of the first bright point in the first image and coordinates of the second bright point in the second image, and calculates the position of the target using $h = D * V_z / V_x$, wherein h is the position, D is the distance, $V_z$ is the first velocity, and $V_x$ is the second velocity.

2. The image processing apparatus according to claim 1, wherein
the first velocity is higher than the second velocity.

3. The image processing apparatus according to claim 2, wherein
the controller generates a composite image obtained by combining the first image and the second image and calculates the distance by using the composite image.

4. An image processing system, comprising:
a microscope having
a stage having a placement surface on which a sample including a target that is subjected to marking is placed,
an objective lens configured to zoom in an image of the sample, and
an image pickup element configured to form the image of the sample zoomed in by the objective lens; and
an image processing apparatus having
an interface configured to connect to the microscope,
a controller configured
to cause, through the interface, a focus of the objective lens to shift from a predetermined reference position in a vertical direction to the placement surface, and causes the image pickup element to be exposed during the shift of the focus in the vertical direction, thereby obtaining a first image including a first bright point that indicates the target, to perform, through the interface, a uniform shift of the focus from the reference position in the vertical direction at a first velocity and a uniform linear shift thereof in a parallel direction to the placement surface at a second velocity, and causes the image pickup element to be exposed during the shift of the focus in the vertical direction and the parallel direction, thereby obtaining a second image including a second bright point that indicates the target, and to calculate a position of the target in the sample in the vertical direction based on the first image and second image obtained, and a memory that stores the first image and second image obtained, wherein the controller calculates a distance between the first bright point and the second bright point in the parallel direction based on coordinates of the first bright point in the first image and coordinates of the second bright point in the second image, and calculates the position of the target using $h=D*V_z/V_x$, wherein h is the position, D is the distance, $V_z$ is the first velocity, and $V_x$, is the second velocity.

5. An image processing method, comprising:

making, by an image processing apparatus, a connection to a microscope having a stage having a placement surface on which a sample including a target that is subjected to marking is placed, an objective lens that zooms in an image of the sample, and an image pickup element that forms the image of the sample zoomed in by the objective lens;

causing, by the image processing apparatus, a focus of the objective lens to shift from a predetermined reference position in a vertical direction to the placement surface, and causing the image pickup element to be exposed during the shift of the focus in the vertical direction, thereby obtaining a first image including a first bright point that indicates the target;

performing, by the image processing apparatus, a uniform shift of the focus from the reference position in the vertical direction at a first velocity and a uniform linear shift thereof in a parallel direction to the placement surface at a second velocity, and causing the image pickup element to be exposed during the shift of the focus in the vertical direction and the parallel direction, thereby obtaining a second image including a second bright point that indicates the target;

storing, in a memory, the first image and second image obtained; and calculating, by the image processing apparatus, a position of the target in the sample in the vertical direction based on the first image and second image stored, wherein a distance between the first bright point and the second bright point in the parallel direction is calculated based on coordinates of the first bright point in the first image and coordinates of the second bright point in the second image, and the position of the target is calculated using $h=D*V_z/V_x$, wherein h is the position, D is the distance, $V_z$ is the first velocity, and $V_x$, is the second velocity.

6. A non-transitory computer readable medium storing a program that causes an image processing apparatus to execute making a connection to a microscope having a stage having a placement surface on which a sample including a target that is subjected to marking is placed, an objective lens that zooms in an image of the sample, and an image pickup element that forms the image of the sample zoomed in by the objective lens, causing a focus of the objective lens to shift from a predetermined reference position in a vertical direction to the placement surface, and causing the image pickup element to be exposed during the shift of the focus in the vertical direction, thereby obtaining a first image including a first bright point that indicates the target, performing a uniform shift of the focus from the reference position in the vertical direction at a first velocity and a uniform linear shift thereof in a parallel direction to the placement surface at a second velocity, and causing the image pickup element to be exposed during the shift of the focus in the vertical direction and the parallel direction, thereby obtaining a second image including a second bright point that indicates the target, storing, in a memory, the first image and second image obtained, and calculating a position of the target in the sample in the vertical direction based on the first image and second image stored, wherein a distance between the first bright point and the second bright point in the parallel direction is calculated based on coordinates of the first bright point in the first image and coordinates of the second bright point in the second image, and the position of the target is calculated using $h=D*V_z/V_x$, wherein h is the position, D is the distance, $V_z$, is the first velocity, and $V_x$, is the second velocity.

* * * * *